Patented Apr. 19, 1949

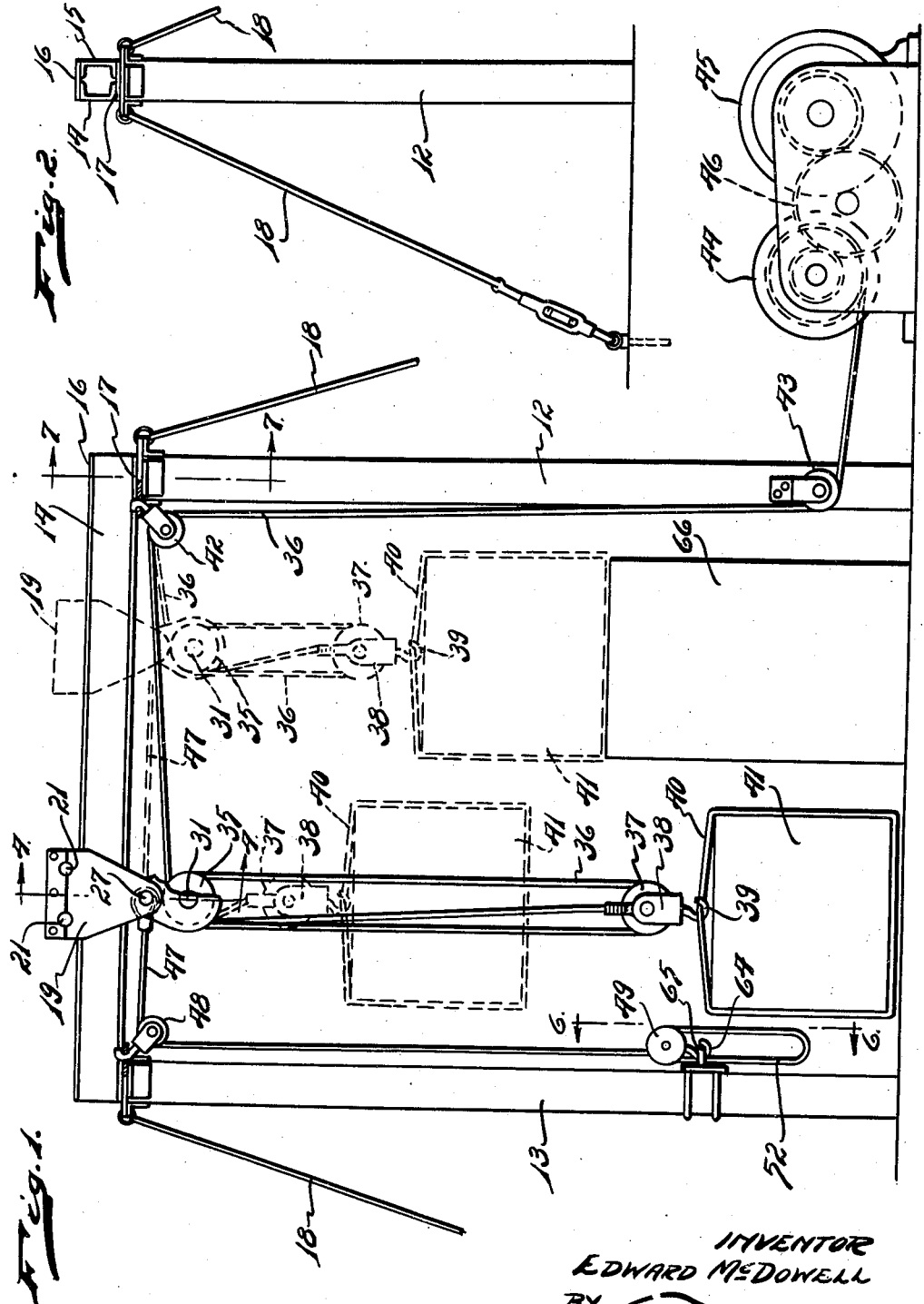

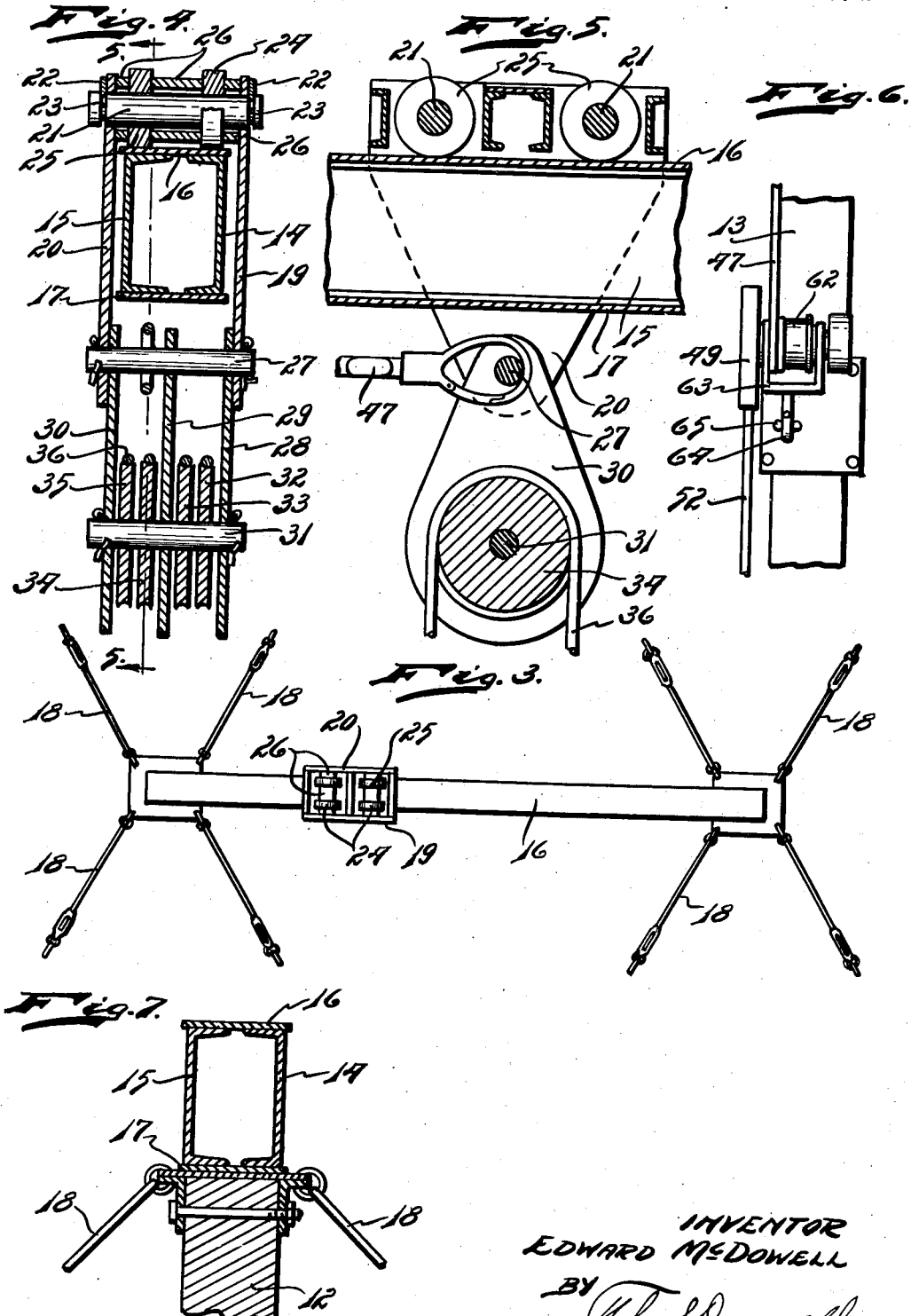

2,467,843

UNITED STATES PATENT OFFICE 2,467,843

WEIGHT LIFTING AND MOVING MECHANISM

Edward McDowell, Detroit, Mich.

Application April 12, 1946, Serial No. 661,730

2 Claims. (Cl. 212—91)

My invention relates to a new and useful improvement in a weight lifting and moving mechanism adapted for lifting heavy weights and moving them after they have been lifted. The invention is particularly adapted for use in moving heavy machinery especially where it is desired to move the machinery a slight distance after it has been lifted.

It is an object of the present invention to provide a construction whereby the lifted weight may be moved laterally from the position from which it is lifted to a new position by its own weight.

Another object of the invention is the provision of a mechanism whereby a weight, when lifted, may be caused through its own weight to travel laterally a predetermined distance.

Another object of the invention is the provision of a supporting mechanism so arranged and constructed that it will be of sufficient strength for supporting heavy weights while permitting a trolley to travel thereon.

Other objects will appear hereinafter.

It is recognized that various modifications and changes may be made in the detail of structure illustrated without departing from the invention itself and it is intended that such shall be embraced within the scope of the claims which form a part hereof.

Forming a part of this specification are drawings in which,

Fig. 1 is a side elevational view of the invention with parts broken away,

Fig. 2 is an end elevational view of the invention with parts broken away,

Fig. 3 is a top plan view of the invention,

Fig. 4 is an enlarged sectional view taken on line 4—4 of Fig. 1,

Fig. 5 is a sectional view taken on line 5—5 of Fig. 4,

Fig. 6 is an enlarged elevational view taken on line 6—6 of Fig. 1 in fragment,

Fig. 7 is a fragmentary sectional view taken on line 7—7 of Fig. 1.

The invention comprises a supporting structure embodying supporting standards or beams 12 and 13 connected together at their upper ends by the horizontal supporting beams 14 and 15 which are connected by the upper plate 16 and the lower plate 17. The guy rods 18 are connected to the structure in a well known manner. Riding on the supporting beam is a trolley embodying the side plates 19 and 20 through which is projected the shaft 21 held in position by the spring rings 22 engaging in the peripheral grooves 23 formed in the shaft 21 at its opposite ends. Rotatably mounted on the shaft 21 are the rollers 24 and 25 and positioned on this shaft 21 are also spacing collars 26. These rollers 24 and 25 are adapted to roll over the upper plate 16.

Supported by this trolley construction is a block and tackle construction embodying the plates 28, 29 and 30 through which is passed the pin 27 pivotally connecting the plates 28, 29 and 30 to the lower ends of the plates 19 and 20. A shaft 31 is projected through the plates 28, 29 and 30 and serves as a bearing for the pulleys 32, 33, 34 and 35 on which is adapted to travel the flexible cable or rope 36. One end of this cable or rope 36 is attached to the yoke 38 which serves to support the pulleys 37 on which the cable 36 is adapted to wind. This yoke 38 also carries the hook 39 which is adapted to engage the rope or cable 40 which is secured around the weight 41 to be lifted. The cable passes around the swingably mounted pulleys 42 and 43 and then is wound upon a drop 44 driven through the gearing 46 by an electric motor 45 or rotated in any suitable manner.

Connected to the pin 27 is one end of a cable 41 which passes around the swingably mounted pulley 48 and is wound upon the drum 62 which may be rotated by the chain block 49 operated by the flexible cable or chain 52. The drum 62 and the chain block 49 are connected to a frame 13 having a hook 64 depending therefrom and engaging in an eyelet 65 mounted on the standard or column 13.

In Fig. 1, I have illustrated a practical application of the invention in which it is illustrated that the weight 41 is to be raised and placed upon the supporting stand 66. In operation a trolley would be brought to a position that is positioned over the weight 41. It will, of course, be understood that the superstructure will be erected in position for carrying out the movements desired. When the trolley is moved to the position over the weight 41 the cable 47 is wound tight and after the proper connections have been made with the weight 41 the winding of the cable 36, upon the drum 44, will lift the weight 41 into the dotted line position shown in Fig. 1. The distance that it is to be lifted will depend to some extent upon the distance that the weight is to travel before it is positioned over the supporting stand or other location at which it is to be lowered into contact with the supporting body. When the weight has been lifted to the dotted line position in Fig. 1, the rotation of the drum 44 will, of course, stop. The operator will then unwind the cable 47 and as the cable 47 is lengthened the trolley will travel to the right of Fig. 1. This travel is effected by the weight of the object 41. When the trolley is released for free movement on the beam the weight of the body 41 will have a tendency to lengthen the distance between the block and the block and tackle construction. In order to do this, however, it is necessary that more of the cable 36 be wound around the pulleys 37 and the pulleys which are supported directly from the trolley. Consequently, the weight in addition to moving to the right of Fig. 1, will also move downwardly and travel to the right and will continue so long as the weight is moving downwardly. Consequently, the weight must be elevated to a predetermined distance sufficiently great to permit horizontal travel while the weight is moving vertically downward. It is believed obvious that by regulating the height of the beam 14 from the weight or from the position it is desired to place the weight upon and proportioning this amount of elevation to the amount of horizontal travel desired, large bodies may be lifted and then caused to travel laterally by virtue of their own weight. It is believed obvious that when the unslacking of the cable 47 is stopped the trolley would again be snubbed and prevented from traveling along the beam on which it is mounted. Consequently, it is possible to accurately control movement of the weight while, at the same time, the lateral movement is effected solely by the gravity of the weight that has been lifted.

It is believed obvious that, if desired, the drum 44 may be rotated to wind up the flexible element 36 and the snubbing element 47 is released. Under such conditions the weight 41 would then remain at its elevated height and the cable or flexible element 36 would serve as a moving bar to move the weight to the right of Fig. 1. On the other hand if the weight be raised at the right side of the superstructure, the snubbing element 47 may be used to draw the trolley to the left of Fig. 1 and, in this case, the drum 44 would have to be rotated to unwind the cable 36 sufficient to permit the travel to the left of Fig. 1 while still retaining the weight 41 at its elevated position.

Experience has shown that this is a very effective and quick method of moving large bodies and particularly in moving heavy machinery from one position to another.

What I claim as new is:

1. A device of the class described comprising: spaced apart supporting standards; a horizontal beam supported by and spanning the distance between said standards; a trolley mounted on said beam for travel along the same; a hoisting mechanism supported by said trolley and comprising a pair of separable parts and means for connecting one of said parts to said trolley; means for connecting the other of said parts to a weight to be lifted; a flexible member extended around said parts and windable thereon for moving said parts into approach relatively to each other; a guide member at one end of said beam around which said flexible member is passed for directing the pull in one direction longitudinally of said beam to said parts mounted on said trolley; a drum for winding said flexible member for moving said parts into approach; a second rotatable drum; a flexible snubbing element connected at one end to said trolley and windable at its other end on said second drum; a guide member connected to the opposite end of said beam around which said snubbing element is passed for directing the pull on said trolley longitudinally of said beam in the direction opposite to the direction of pull of the first named flexible element on said trolley, said drums being independently operable.

2. A device of the class described, comprising: spaced apart supporting standards; a horizontal beam supported by and spanning the distance between said standards; a trolley mounted on said beam for travel along the same; a hoisting mechanism supported by said trolley and comprising a pair of separable parts and means for connecting one of said parts to said trolley; means for connecting the other of said parts to a weight to be lifted; a flexible member extended around said parts and windable thereon for moving said parts into approach relatively to each other; a guide member at one end of said beam around which said flexible member is passed for directing the pull in one direction longitudinally of said beam to said parts mounted on said trolley; a drum for winding said flexible member for moving said parts into approach; a second rotatable drum; a flexible snubbing element connected at one end of said trolley and windable at its other end on said second drum; a guide member connected to the opposite end of said beam around which said snubbing element is passed for directing the pull on said trolley longitudinally of said beam in the direction opposite to the direction of pull of the first named flexible element on said trolley, said drums being independently operable, said second drum being releasible while said first drum is stationary for permitting unwinding of said snubbing element and travel of said trolley along said beam in response to said pull and proportionate to the lowering of said weight.

EDWARD McDOWELL.

REFERENCES CITED

The following references are of record in the file of this patent:

UNITED STATES PATENTS

| Number | Name | Date |
|---|---|---|
| 86,703 | Shoemaker et al. | Feb. 9, 1869 |
| 174,446 | Smith | Mar. 7, 1876 |
| 184,848 | Dow | Nov. 28, 1876 |
| 263,666 | Pratt | Aug. 29, 1882 |